(12) United States Patent
Mizerovsky et al.

(10) Patent No.: US 12,060,804 B2
(45) Date of Patent: Aug. 13, 2024

(54) TURBOCHARGER TURBINE HOUSING

(71) Applicant: Garrett Transportation I Inc., Torrance, CA (US)

(72) Inventors: Karel Mizerovsky, Brno (CZ); Pavel Stepanek, Brno (CZ); Jan Klement, Brno (CZ); Adam Ohnút, Brno (CZ)

(73) Assignee: GARRET TRANSPORTATION I INC., Torrance, CA (US)

( * ) Notice: Subject to any disclaimer, the term of this patent is extended or adjusted under 35 U.S.C. 154(b) by 85 days.

(21) Appl. No.: 17/485,463

(22) Filed: Sep. 26, 2021

(65) Prior Publication Data

US 2023/0095482 A1 Mar. 30, 2023

(51) Int. Cl.
*F01D 25/24* (2006.01)
*F01D 9/02* (2006.01)

(52) U.S. Cl.
CPC .............. *F01D 25/24* (2013.01); *F01D 9/02* (2013.01); *F05D 2220/40* (2013.01); *F05D 2230/21* (2013.01); *F05D 2250/38* (2013.01)

(58) Field of Classification Search
CPC ............. F05D 2220/40; F05D 2230/21; F05D 2250/38
See application file for complete search history.

(56) References Cited

U.S. PATENT DOCUMENTS

| 4,256,441 | A | 3/1981 | Arora | |
|---|---|---|---|---|
| 8,387,243 | B2 * | 3/2013 | An | F01N 13/10 29/889.22 |
| 9,341,081 | B2 * | 5/2016 | Smatloch | F01D 25/24 |
| 10,240,485 | B2 * | 3/2019 | Grussmann | F01N 13/10 |
| 10,494,990 | B2 * | 12/2019 | Sauerstein | F02B 37/18 |
| 10,851,705 | B1 * | 12/2020 | Avola | F02C 6/12 |
| 10,865,704 | B2 * | 12/2020 | Sieber | F02B 39/10 |
| 11,371,367 | B2 * | 6/2022 | Okamoto | F01D 9/06 |
| 2015/0377064 | A1 | 12/2015 | Herrera Celaya et al. | |

(Continued)

FOREIGN PATENT DOCUMENTS

| DE | 102019202380 A1 * | 8/2020 | .............. F01D 17/10 |
|---|---|---|---|
| JP | S 56-6917 A | 1/1981 | |

OTHER PUBLICATIONS

Ibrahim et al., Understanding Flow through Catalytic Converters, Proceedings of the 4th International Conference of Fluid Flow, Heat and Mass Transfer, Canada, Aug. 21-23, 2017, Paper No. 135 (DOI: 10.11159/ffhmt17.135) (7 pages).

(Continued)

*Primary Examiner* — Courtney D Heinle
*Assistant Examiner* — Danielle M. Christensen
(74) *Attorney, Agent, or Firm* — BelayIP

(57) ABSTRACT

A turbine housing can include a bearing housing end and a treatment unit end; a volute wall that defines a volute; a wall that defines at least a portion of a turbine wheel space that defines a turbine wheel space axis and a turbine wheel space diameter, where the wall extends to an axial peak to define an extended space with an extended space outlet having an extended space outlet dimension; and an outlet wall that defines an outlet space with a treatment unit end outlet having an outlet dimension, where the extended space is disposed at least in part axially between the turbine wheel space and the outlet space to increase axial velocity uniformity at the treatment unit end outlet.

20 Claims, 12 Drawing Sheets

(56) References Cited

U.S. PATENT DOCUMENTS

| | | | |
|---|---|---|---|
| 2017/0234153 A1* | 8/2017 | Williams | ............... F01D 9/041 415/148 |
| 2020/0291957 A1 | 9/2020 | Dietrich | |
| 2021/0079809 A1 | 3/2021 | Mohamed et al. | |

OTHER PUBLICATIONS

ECS Tuning, Audi B7 A4 2.0T Downpipe & High-Flow Cat, Installation Instructions ES3678162, Apr. 22, 2019 (15 pages).
Extended European Search Report, Application No. EP22188590.8, Oct. 28, 2022 (11 pages).

* cited by examiner

TURBOCHARGER TURBINE HOUSING

TECHNICAL FIELD

Subject matter disclosed herein relates generally to turbocharger turbine housings for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. As an example, a shaft that is attached to one or more bladed wheels may be supported by one or more bearings disposed in a bearing housing, which may form a center housing rotating assembly (CHRA). During operation of a turbocharger, depending on factors such as size of various components, a SWA may be expected to rotate at speeds in excess of 200,000 rpm.

A turbine wheel can be positioned in a turbine housing where the turbine housing can include one or more volutes that are shaped and sized to direct flow of exhaust to the turbine wheel. For example, a turbine housing can include an inlet and an outlet where exhaust is directed from the inlet to one or more volutes to a turbine wheel space and then from the turbine wheel space to the outlet. Exhaust from the outlet may be directed to one or more components for exhaust treatment, which may include treatment as to one or more of chemical composition, heat content and noise.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
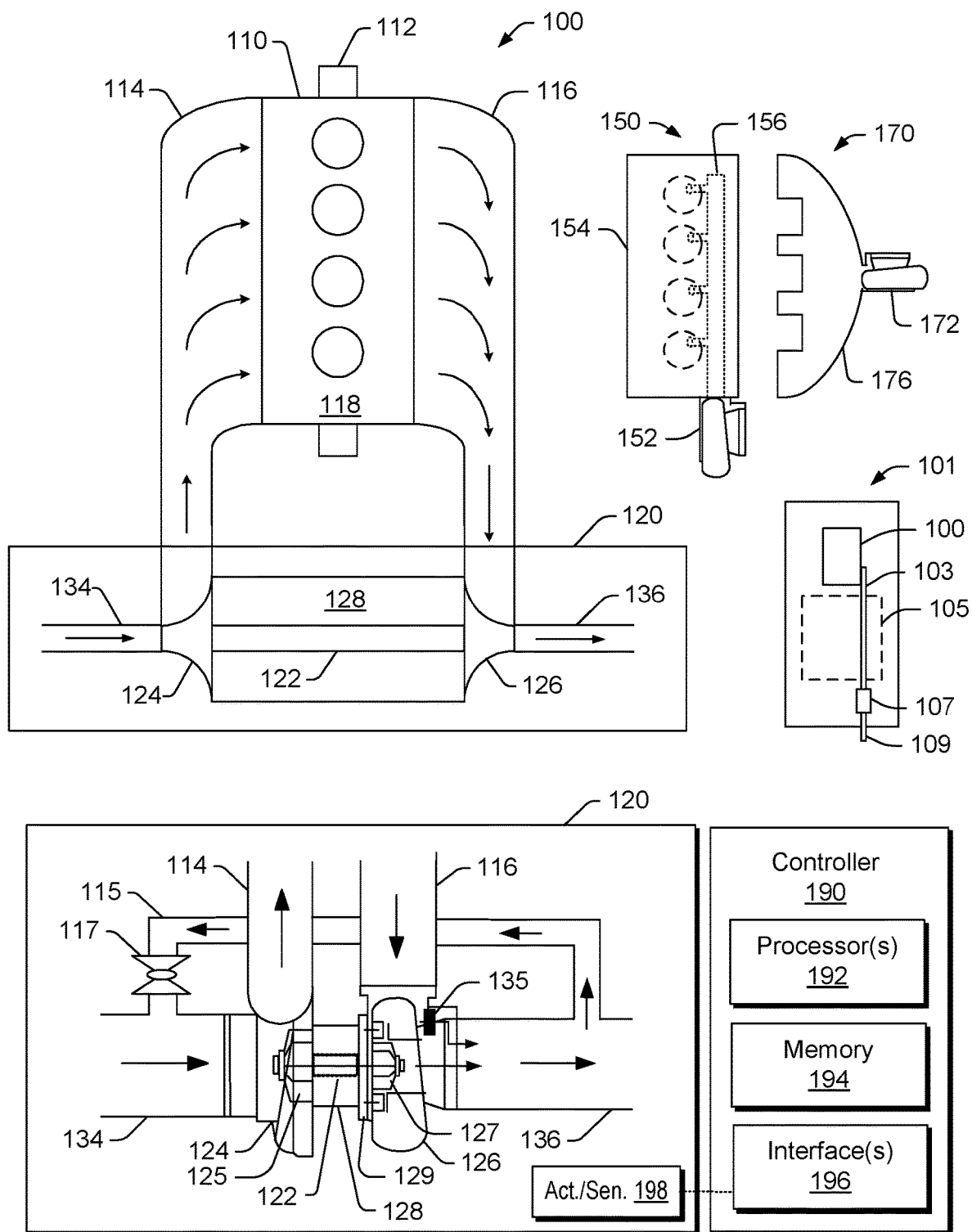
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.). As an example, a silencer such as a muffler may be included that aims to reduce sound emissions. As an example, a combined treatment unit and silencer may be utilized along an exhaust flow path or exhaust flow paths.

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In the turbocharger 120 of FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
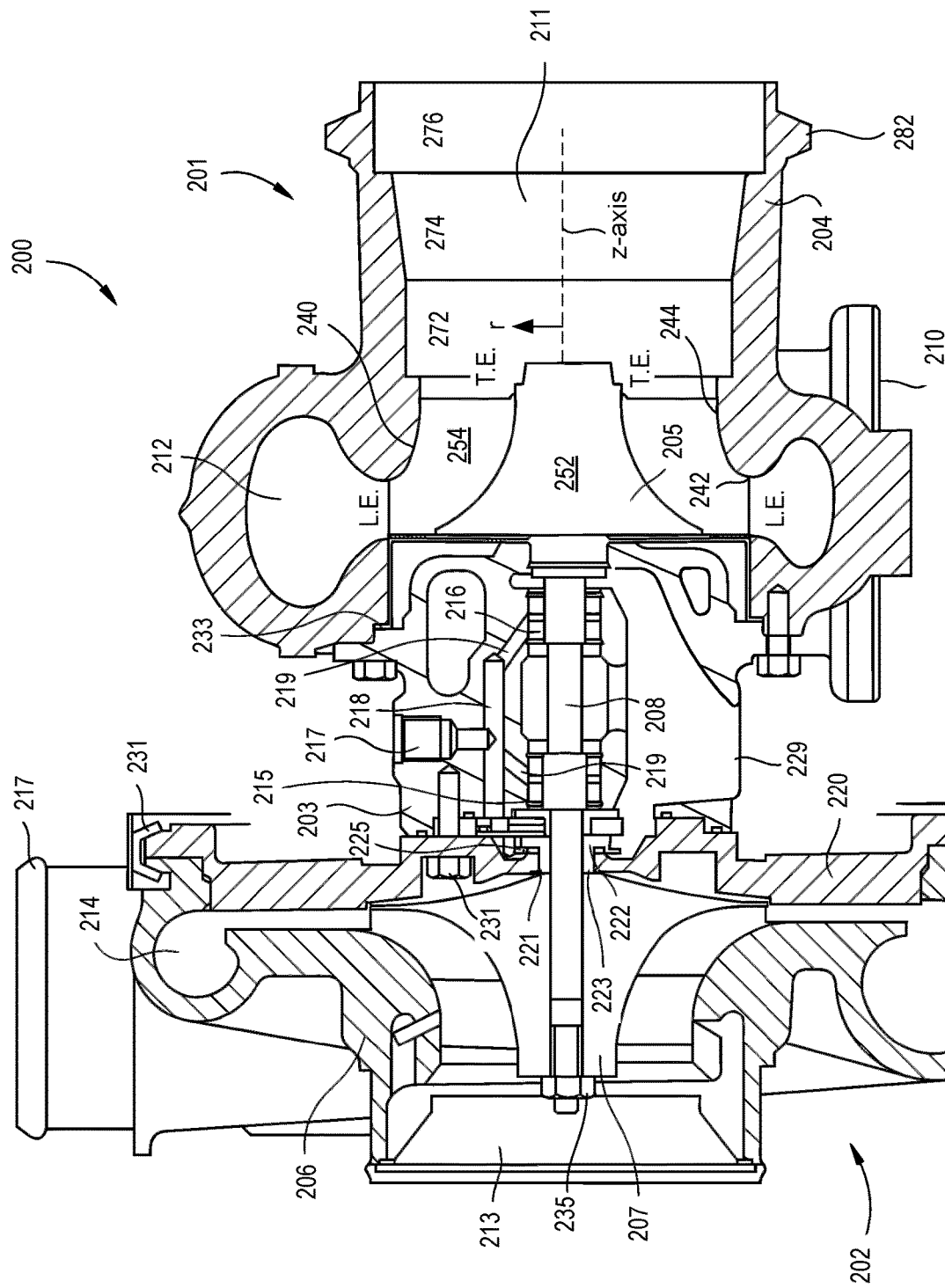
FIG. 2 is a cross-sectional view of an example of a turbocharger.

FIG. 2 shows an example of a turbocharger 200 that includes a turbine assembly 201, a compressor assembly 202 and a center housing 203. The turbine assembly 201 includes a turbine housing 204 that is shaped to accommodate a turbine wheel 205 and the compressor assembly 202 includes a compressor housing 206 that is shaped to accommodate a compressor wheel 207. As shown, a shaft 208 operatively couples the turbine wheel 205 and the compressor wheel 207 as supported by one or more bearings 215 and 216 in a through bore of the center housing 203.

As shown in FIG. 2, the turbine housing 204 can include an exhaust inlet 210 and an exhaust outlet 211 where a volute 212 is defined at least in part by the turbine housing 204. The volute 212 can be referred to as a scroll that decreases in its cross-sectional diameter as it spirals inwardly toward a turbine wheel space that accommodates the turbine wheel 205.

As shown in FIG. 2, the compressor housing 206 can include an air inlet 213 and an air outlet 211 where a volute 214 is defined at least in part by the compressor housing 206. The volute 214 can be referred to as a scroll that increases in its cross-sectional diameter as it spirals outwardly from a compressor wheel space that accommodates the compressor wheel 207.

Disposed between the compressor housing 206 and the center housing 203 is a backplate 220, which includes a bore 221 that can receive a thrust collar 222, which can abut against a base end 223 of the compressor wheel 207. As shown, the thrust collar 222 can include a lubricant slinger 225 that extends radially outward, which can help to reduce undesirable flow of lubricant (e.g., to the compressor wheel space, etc.).

The center housing 203 includes various lubricant features such as a lubricant inlet 217, a lubricant bore 218, lubricant jets 219, and a lubricant drain 229. As shown, lubricant can be provided at the lubricant inlet 217 to flow to the lubricant bore 218 and to the lubricant jets 219, which include a compressor side jet for directing lubricant to the bearing 215 and a turbine side jet for directing lubricant to the bearing 216. Lubricant can carry heat energy away from the bearings 215 and 216 as they rotatably support the shaft 208 as the turbine wheel 205 is driven by flow of exhaust through the turbine housing 204.

As shown in the example of FIG. 2, the compressor housing 206 can be clipped to the backplate 220 via a clip 231, the backplate 220 can be bolted to the center housing 203 via bolt or bolts 232 and the center housing 203 can be bolted to the turbine housing 204 via a bolt or bolts 233; noting that various other techniques may be utilized to couple the components to form a turbocharger.

In the example of FIG. 2, one or more of the housings 203, 204 and 206 may be cast. For example, the turbine housing 204 may be cast from iron, steel, nickel alloy, etc. As an example, consider a Ni-Resist cast iron alloy with a sufficient amount of nickel to produce an austenitic structure. For example, consider nickel being present from approximately 12 percent by weight to approximately 40 percent by weight. As an example, an increased amount of nickel can provide for a reduced coefficient of thermal expansion (e.g., consider a minimum at approximately 35 percent by weight). However, increased nickel content can increase cost of an Ni-Resist material; noting that density tends to be relatively constant over a large range of nickel content (e.g., approximately 7.3 to 7.6 grams per cubic centimeter). The density of Ni-Resist material tends to be approximately 5 percent higher than for gray cast iron and approximately 15 percent lower than cast bronze alloys. As to machinability, Ni-Resist materials tend to be better than cast steels; noting that increased chromium content tends to decrease machinability due to increasing amounts of hard carbides. When compared to stainless steel (e.g., density of approximately 8 grams per cubic centimeter), Ni-Resist materials can be less costly and of lesser mass (e.g., lesser density).

Ni-Resist materials tend to exhibit suitable high temperature properties, which may be at rated to over 480 degrees C. (900 degrees F.). Ni-Resist materials can be suitable for turbocharges for diesel and gasoline internal combustion engines. As an example, a diesel engine can have exhaust that may be at about 860 degrees C. and, as an example, a gasoline engine can have exhaust that may be at about 1050 degrees C. Such exhaust can be received by a turbine assembly that includes a turbine housing made of a suitable material.

As shown, the turbine housing 204 may be a relatively large component when compared to the compressor housing 206 and the center housing 203 such that the mass of the turbine housing 204 contributes significantly to the mass of the turbocharger 200.

In the example of FIG. 2, various components of the turbocharger 200 may be defined with respect to a cylindrical coordinately system that includes a z-axis centered on a through bore of the center housing 203, which can coincide with the rotational axis of a rotating assembly that includes the turbine wheel 205, the compressor wheel 207 and the shaft 208. As mentioned, a turbine wheel may be welded to a shaft to form a shaft and wheel assembly (SWA) and a compressor wheel may be threaded onto an end of a shaft (e.g., a "boreless" compressor wheel) or have a through bore that receives a free end of the shaft where a nut or other suitable component is used to secure the compressor wheel to the shaft. In the example of FIG. 2, the turbine wheel 205 is welded to the shaft 208 and a nut 235 is used to secure the compressor wheel 207 to the shaft 208 and, hence, the turbine wheel 205.

In the example of FIG. 2, a clearance exists between blades 254 that extend from a hub 252 of the turbine wheel 205 and a shroud portion 240 of the turbine housing 204. As shown, the shroud portion 240, in the cross-sectional view is "J" shaped, which can define a body of rotation that has an annular ridge portion 242 and a cylindrical portion 244. As shown, the annular ridge portion 242 can define a nozzle for exhaust that flows from the volute 212 to the turbine wheel space at an inducer portion of the turbine wheel 205, which can be defined by leading edges where each of the blades 254 includes a leading edge (L.E.). As shown, the turbine wheel 205 also includes an exducer portion where each of the blades 254 includes a trailing edge (T.E.). During operation, exhaust flows from the volute 212 via the nozzle defined in part by the annular ridge portion 242 of the shroud portion 240 to the leading edges of the blades 254, along channels defined by adjacent blades 254 of the turbine wheel 205 as confined between the hub 252 and the cylindrical portion 244 of the shroud portion 240 and then to the trailing edges of the blades 254 where the exhaust is confined by a larger diameter cylindrical wall 272, a slightly conical wall 274 and a yet larger diameter cylindrical wall 276. As shown in FIG. 2, the cylindrical wall 276 can be defined by a portion of the turbine housing 204 that includes a fitting such as an annular ridge 282 that can be utilized to secure an exhaust conduit to the turbine housing 204. Such an exhaust conduit may be in fluid communication with one or more other components such as an exhaust treatment unit, a muffler, another turbocharger, etc. As to the exhaust inlet 210 of the turbine housing 204, it too may be shaped to couple to one or more exhaust conduits such as, for example, an exhaust header, an exhaust manifold, another turbine housing (e.g., for a multi-stage turbocharger arrangement), etc.

As shown in FIG. 2, the turbine housing 204 severs various functions through its structural features and shapes thereof; however, such structural features can contribute to mass of the turbocharger.

As an example, a turbocharger may weigh from approximately 4 kilograms (e.g., 8.8 lbs) to approximately 40 kilograms (e.g., 88 lbs) or more.

As mentioned, a turbocharger can be defined with respect to a cylindrical coordinate system where a z-axis may be along a length. In the example of FIG. 2, the length of the turbine housing 204 is over 50 percent of the total length. The overall length or size of a turbocharger can be a factor when installing in an engine compartment of a vehicle as it presents design constraints.

The turbocharger 200 of FIG. 2 can be cooled via one or more media, such as lubricant (e.g., oil), water (e.g., radiator fluid, etc.), and air (e.g., via an environment with ambient air or vehicle engine compartment air).

As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system. To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled (e.g., as mentioned, a diesel engine may have exhaust at about 860 degrees C. and a gasoline engine may have exhaust at about 1050 degrees C.). Also, as to temperature, consider the example arrangements 150 and 170 of FIG. 1 where the turbine housing assemblies 152 and 172 are in close proximity to combustion cylinders, which may result in the turbine housing assemblies 152 and 172 experiencing higher exhaust temperatures and/or higher ambient temperatures.

Figure 3:
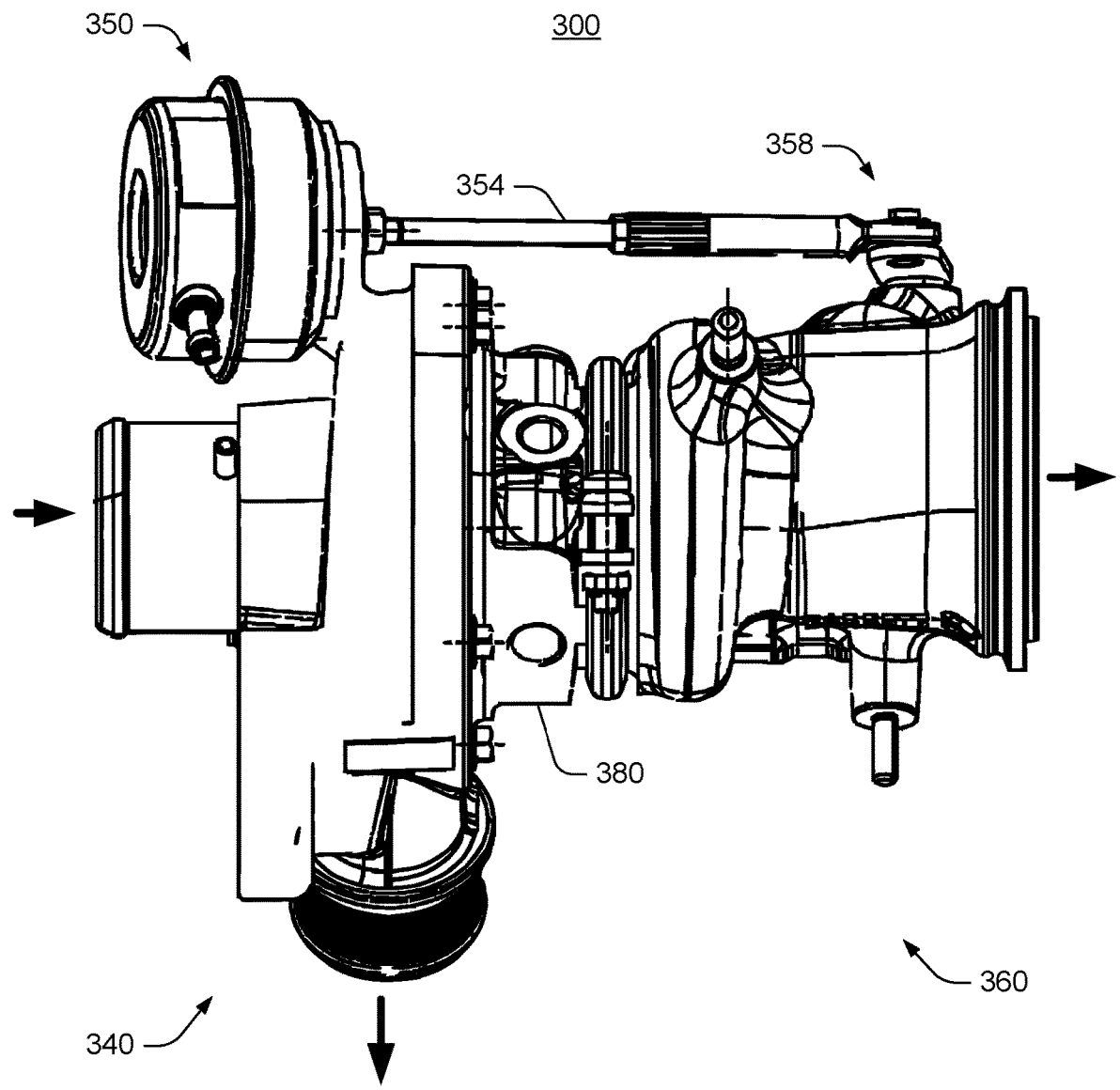
FIG. 3 is a side view of an example of a turbocharger.

FIG. 3 shows an example of a turbocharger 300 that includes a compressor assembly 340 with a compressor housing for a compressor wheel, a turbine assembly 360 with a turbine housing for a turbine wheel, a center housing 380 for a bearing, bearings or a bearing assembly to rotatably support a shaft of a shaft and wheel assembly (SWA), and an actuator 350 with a linkage 354 to a control arm assembly 358 for a wastegate of the turbine assembly 360. The turbocharger 300 can include one or more of the components shown in FIG. 2. In the view of FIG. 3, the exhaust inlet of the turbine assembly 360 is not visible because it is on the opposite side. General directions of flow of air or exhaust are indicated by arrows. The actuator 350 is shown as being mounted to the compressor assembly 340, which can help to reduce temperatures experienced by the actuator 350 (e.g., compared to having the actuator mounted on a turbine housing). The turbocharger 300 can be part of a vehicle such as, for example, the vehicle 101 of FIG. 1. As an example, the turbine assembly 360 may optionally be arranged such as in one of the example arrangements 150 or 170 of FIG. 1.

Figure 4A:
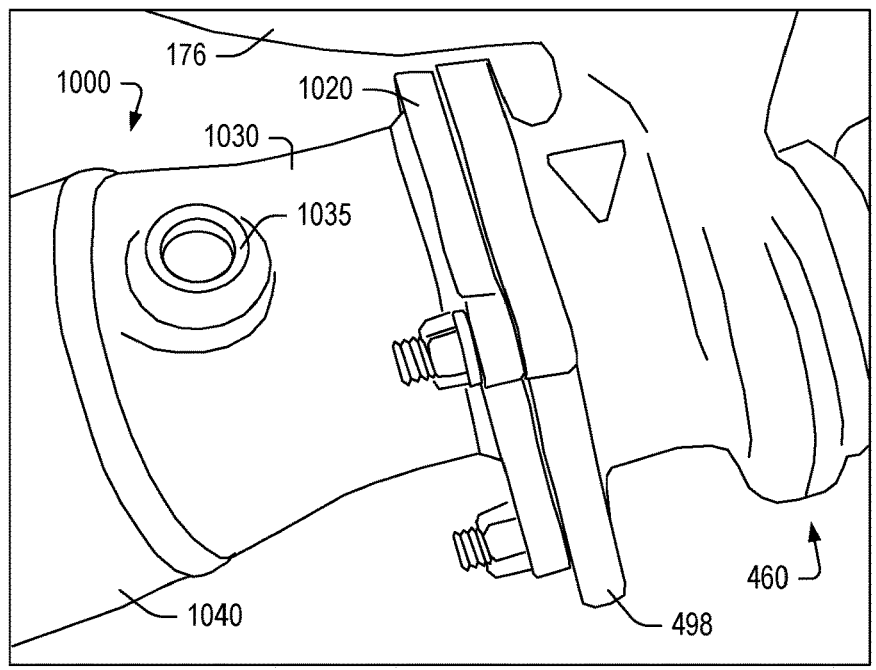
FIG. 4A and FIG. 4B are a perspective view of an example of a turbocharger turbine housing coupled to an example of a catalytic converter and an end view of the catalytic converter, respectively.
Figure 4B:
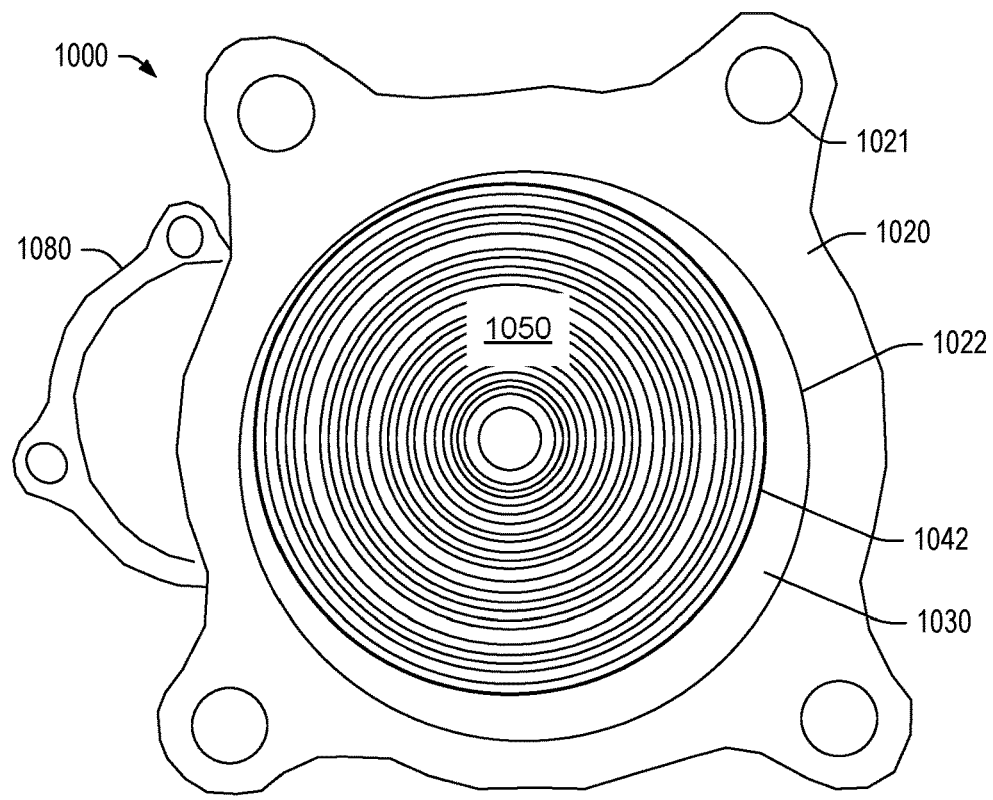

FIG. 4A and FIG. 4B show views of an example of a portion of a system that includes a manifold 176, a turbine housing 460 and a treatment unit 1000. As shown, the turbine housing 460 can be integral to the manifold 176 and can include a flange 498 for coupling to the treatment unit 1000, for example, via a flange 1020 of the treatment unit 1000. The treatment unit 1000 can include flared pipe 1030 that increases in diameter from the flange 1020 to a catalyst housing 1040 where the flared pipe 1030 may include one or more fittings 1035 for equipment coupling (e.g., one or more sensors, one or more conduits, etc.). As shown, the treatment unit 1000 can include the flange 1020 as a proximal flange and another flange 1080 as a distal flange where exhaust flows generally in a direction from the flange 1020 to the flange 1080. The flange 1020 can include features 1021 for coupling to the flange 498 of the turbine housing 460, which may be via bolts, etc. As an example, a band may be utilized, threads, a bayonet, etc., to couple a turbine housing to a treatment unit.

As shown in FIG. 4B, the flange 1020 can include an opening 1022 that leads to the flared pipe 1030, which leads to an opening 1042 of the catalyst housing 1040. As shown, a catalyst assembly 1050 may be disposed in the catalyst housing 1040 where, for example, the catalyst assembly 1050 can include support material that supports one or more catalysts.

Emissions from an internal combustion engine can include constituents such as carbon monoxide, unburnt hydrocarbons and nitrogen oxides. Catalytic converters (e.g., treatment units) can reduce emissions; however, they introduce some losses such as increased engine back pressure. As an example, a catalytic converter can include one or more types of catalyst assemblies. For example, consider a concentric approach, a spiral approach, etc., which may provide relatively straight passages along a length of a catalytic converters. As an example, consider a cordierite ceramic monolith that may be formed into a honeycomb-like structure with straight channels. In various instances, straight channels may help to reduce pressure losses and provide for higher conversion efficiency of pollutants due to better flow distribution.

While treatment unit configuration can impact flow distribution, as explained herein, so can a turbine assembly. For example, if exhaust flow is maldistributed upon exiting a turbine housing, then it may be maldistributed upon entry to a treatment unit. In such an example, the features of the treatment unit that aim to provide for better flow distribution may help to retain the maldistribution of entering exhaust.

An article by Ibrahim et al., Understanding Flow through Catalytic Converters, Proceedings of the 4$^{th}$ International Conference of Fluid Flow, Heat and Mass Transfer, Canada, Aug. 21-23, 2017, Paper No. 135 (DOI: 10.11159/ffhmt17.135) is incorporated by reference herein. The article by Ibrahim et al. presents computational fluid dynamics (CFD) model results for flow behavior through a catalytic converter using a model with a straight vertical inlet pipe with an inlet diameter of 5 cm and length of 53 cm along with a 7.6 cm diameter and 7.6 cm long monolith container coupled to an exit pipe 18 cm long and 5 cm in diameter where both inlet and exit diffusers had a cone angle of 45° and a length of 2.5 cm. As indicated, the inlet flow profile to the monolith container benefits from over ten diameters of axial length of a straight pipe (i.e., diameter of 5 cm with a length of 53 cm) along with the inlet diffuser (flared pipe). The article by Ibrahim et al. does not mention turbochargers.

Figure 5:
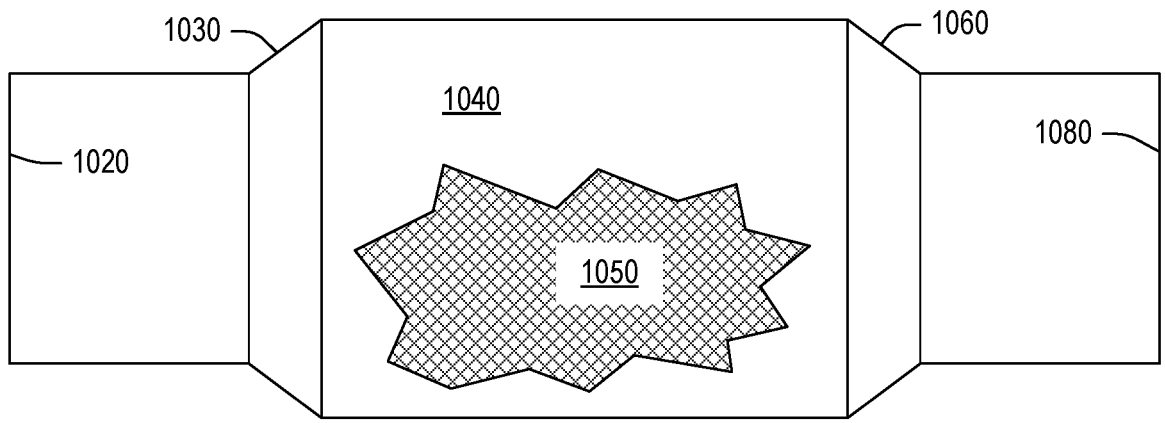
FIG. 5 is a series of diagrams of examples of phenomena associated with a catalytic converter.
Figure 5:
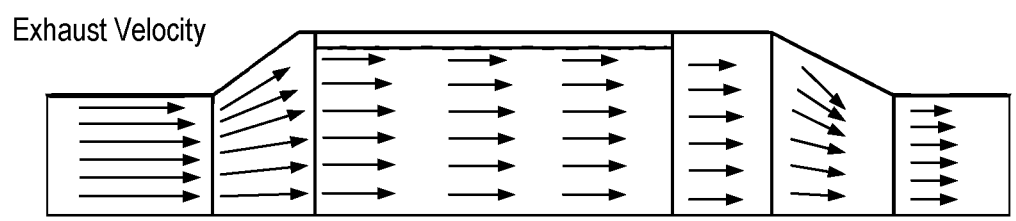
Figure 5:
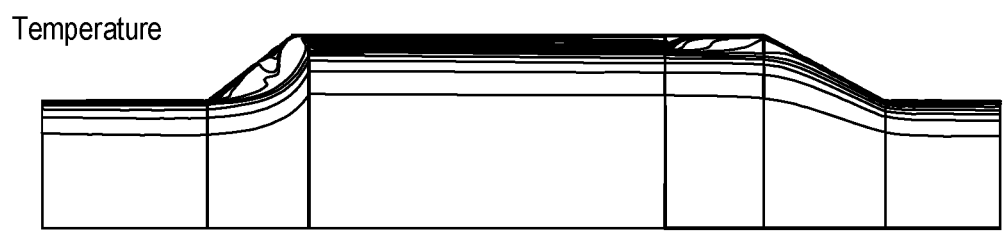
Figure 5:
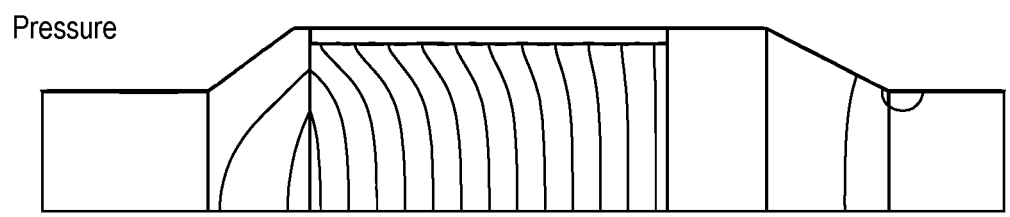

FIG. 5 shows various diagrams that indicate general results of the CFD modeling of the article by Ibrahim et al., including a diagram of a catalytic converter 1040 with an inlet 1020, an inlet diffuser 1030, an outlet diffuser 1060 and an outlet 1080 where a catalyst assembly 1050 is contained within the catalytic converter. As shown, exhaust velocity is relatively uniform upon entry to the inlet diffuser 1030 where the velocity decreases. As indicated, pressure contours represent decreasing pressure as exhaust flows through the catalytic converter 1040.

The article by Ibrahim et al. noted that flow uniformity was increased by utilizing higher cell density monoliths with smaller hydraulic diameter and by splitting the monolith into two parts separated by a gap and that lower flow uniformity was observed in 3D steady state and transient numerical simulations in systems with higher monolith-to-inlet diameter ratios. The article by Ibrahim et al. also noted that the monolith acts as a flow resistance zone creating a high pressure area in the center of the catalytic converter that forces flow redistribution to the sides and that "the design of the inlet diffuser was found to play an important role in the converter design".

Referring again to the example of FIG. 4A, space for a 10 diameter long axial length of pipe may not be available in an engine compartment and, for example, a turbine housing may be integrally cast with an exhaust manifold. In various applications, preservation of heat energy can improve turbine performance and can improve catalyst performance. Preservation of heat energy can be accomplished by reducing flow path lengths, which may also reduce wall losses of exhaust flow.

In the example of FIG. 4A, the outlet of the turbine housing 460 directs exhaust into the treatment unit 1000 where a relatively short distance from a turbine wheel space to the outlet can help to reduce spread (e.g., help to aim gas into the catalyst and ensure stable function). A metric as to exhaust flowing out of a turbine housing can be uniformity index, which may also be a specification of a treatment unit. For example, a higher uniformity index of a turbine housing can help to provide a specified catalyst inflow uniformity index and pressure gradient, which tend to be factors that define and ensure proper catalyst functionality. Proper function of a catalyst assembly tends to depend on proper heat distribution at the inlet of the catalyst assembly. Flow uniformity index can dictate catalyst reaction efficiency.

Another potential design factor that can impact functionality is, as shown in the example of FIG. 4A, the axis of the turbine housing 460 (e.g., turbine wheel rotational axis) being shifted with respect to the axis of the catalyst assembly 1050 of the treatment unit 1000. Such a shift can result in a maldistribution of heat at catalyst inlet area where, for example, flow may not be in a perpendicular direction to a frontal surface of the catalyst assembly 1050. Such a factor can have an impact on catalyst reaction efficiency and in connection with it on stability of gas conversion.

Figure 6:
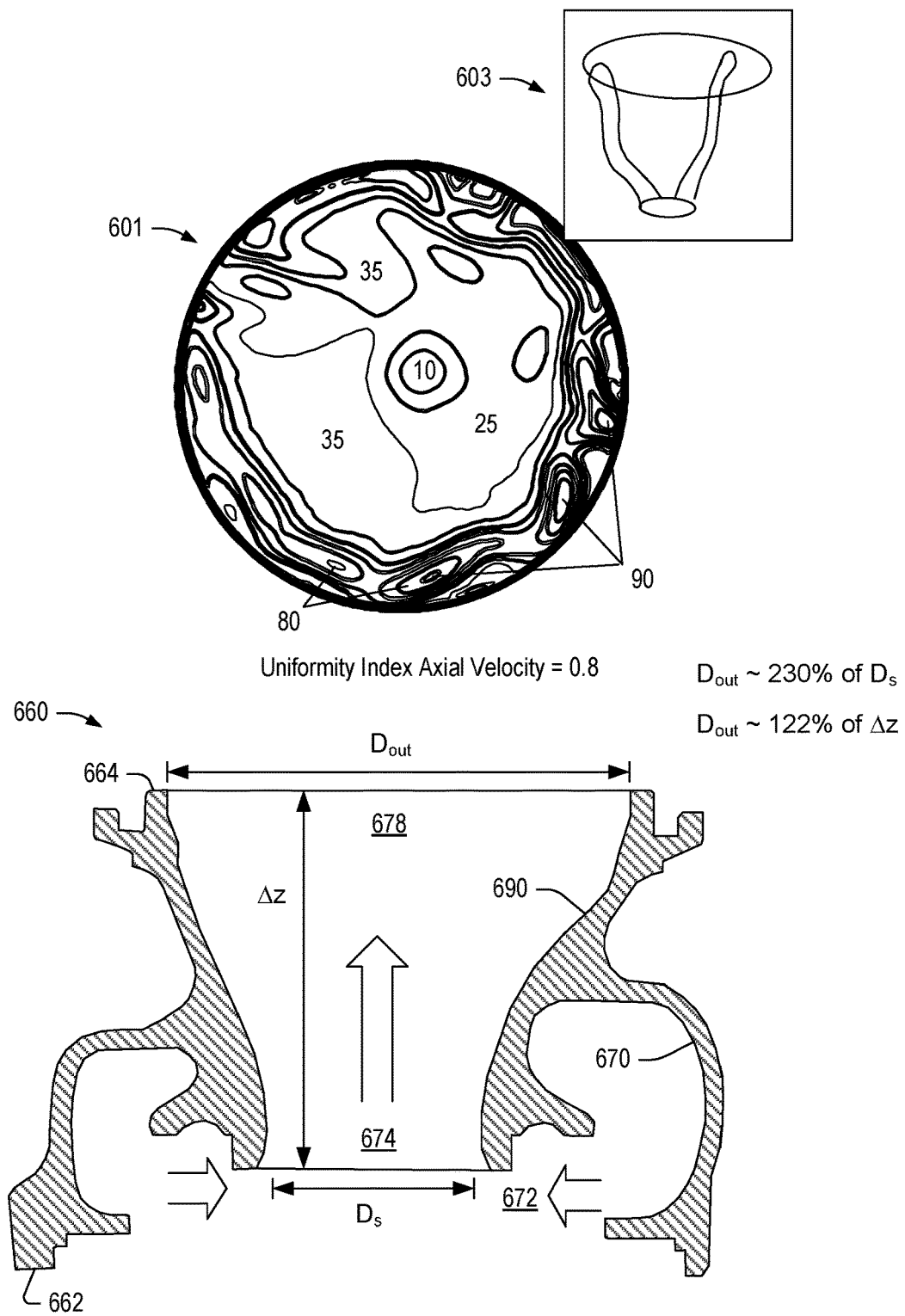
FIG. 6 is a series of diagrams pertaining to exhaust flow in a turbine housing.

FIG. 6 shows example plots 601 and 603 of exhaust flow of a turbine housing 660, which is shown in a cross-sectional view. As shown, the turbine housing 660 includes opposing ends 662 and 664, a volute wall 670, a nozzle space 672, a turbine wheel space 674 and an outlet space 678 where the turbine space 674 and the outlet space 678 are defined by a wall 690. Dimensions can include a shroud diameter $D_s$ of the turbine wheel space 674 and an outlet diameter $D_{out}$ of the outlet space 678, along with an axial dimension $\Delta z$ of the wall 690. As explained, a relatively short axial distance between the turbine wheel space 674 and the end 664 may be utilized.

In FIG. 6, the turbine housing 660 has a contiguous wall 690 that increases in its cross-sectional area from an axial position corresponding to $D_s$ to an axial position corresponding to $D_{out}$, except for a relatively small portion near the end 664, which may be of a constant cross-sectional area (e.g., a cylindrical portion of the wall 690).

In the example of FIG. 6, the uniformity index of the axial velocity is 0.8 where $D_{out}$ is approximately 230 percent of $D_s$ and approximately 122 percent of $\Delta z$. As shown in the plots 601 and 603, the axial velocity tends to be higher near the wall 690 and lesser near the center (see, e.g., contours for 90 near wall and 10 near the center). The difference in contour values and positions of the contours lead to the uniformity index being substantially less than unity (e.g., 0.2 less than unity).

Figure 7:
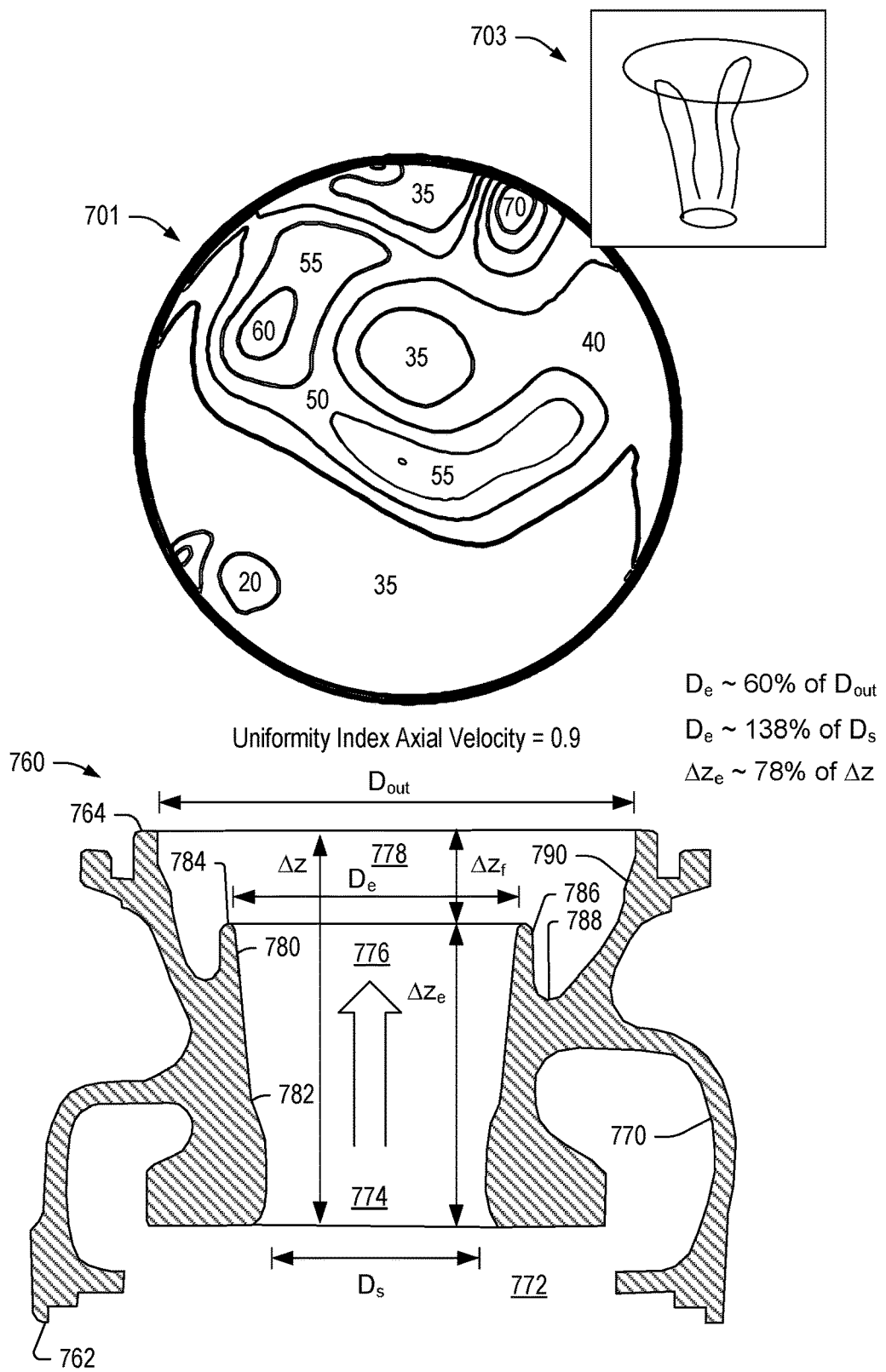
FIG. 7 is a series of diagrams pertaining to exhaust flow in an example of a turbine housing.

FIG. 7 shows example plots 701 and 703 of exhaust flow of a turbine housing 760, which is shown in a cross-sectional view. As shown, the turbine housing 760 includes opposing ends 762 and 764, a volute wall 770, a nozzle space 772, a turbine wheel space 774, an extended space 776 and an outlet space 778 where the extended space 776 is disposed between the turbine wheel space 774 and the outlet space 778. As shown, a wall 780 defines the turbine wheel space 774 and the extended space 776 where the wall 780 transitions to a wall 790 that defines the outlet space 778. As shown, the wall 780 reaches an annular axial peak 784 where it descends axially along a substantially cylindrical portion 786 to an annular axial valley 788. The wall 790 then extends from the annular axial valley 788 to the end 764.

In the example of FIG. 7, the turbine housing 760 includes a transition region where the wall 780 transitions to the wall 790. As shown, a single wall of increasing cross-sectional area is not present; rather, the wall 780 can be set within the wall 790 where a transition region may connect the wall 780 and the wall 790. In the example of FIG. 7, the turbine housing 760 includes a double wall for various axial positions. For example, consider a cutting plane at an axial position just above the annular axial valley 788 where the wall 780 forms a passage bounded by the wall 790. As an example, the annular axial peak 784 of the wall 780 may extend axially higher than shown in the example of FIG. 7. For example, consider the annular axial peak 784 extending toward the end 764 and/or past the end 764 (e.g., to define an overall axial length of the turbine housing 760).

As shown in FIG. 7, dimensions can include a shroud diameter $D_s$ of the turbine wheel space 774 and an outlet dimension $D_{out}$ of the outlet space 778, along with an axial dimension $\Delta z$. The outlet dimension $D_{out}$ may be a diameter of a circular outlet or a dimension of a non-circular outlet (e.g., an oval outlet, an ellipsoidal outlet, etc.). As explained, a relatively short axial distance between the turbine wheel space 774 and the end 764 may be utilized. Additionally, dimensions can include an extended axial dimension $\Delta z_e$ and a dimension of an intermediate outlet, $D_e$, being the outlet of the extended space 776, which may be a diameter of a circular outlet or a dimension of a non-circular outlet (e.g., an oval outlet, an ellipsoidal outlet, etc.).

In the example of FIG. 7, the uniformity index of the axial velocity is 0.9 where $D_{out}$ is approximately 230 percent of $D_s$ and approximately 122 percent of $\Delta z$ and where $D_e$ is approximately 60 percent of $D_{out}$ and 138 percent of $D_s$, along with $\Delta z_e$ being approximately 78 percent of $\Delta z$; noting, that as mentioned, $\Delta z_e$ may define $\Delta z$ where the peak 784 extends past the end 764. As shown in the plots 701 and 703, the axial velocity tends to be more uniform with lesser differences between low and high contours such that the higher near the wall 790 velocities are reduced compared to the example of FIG. 6.

Figure 8:
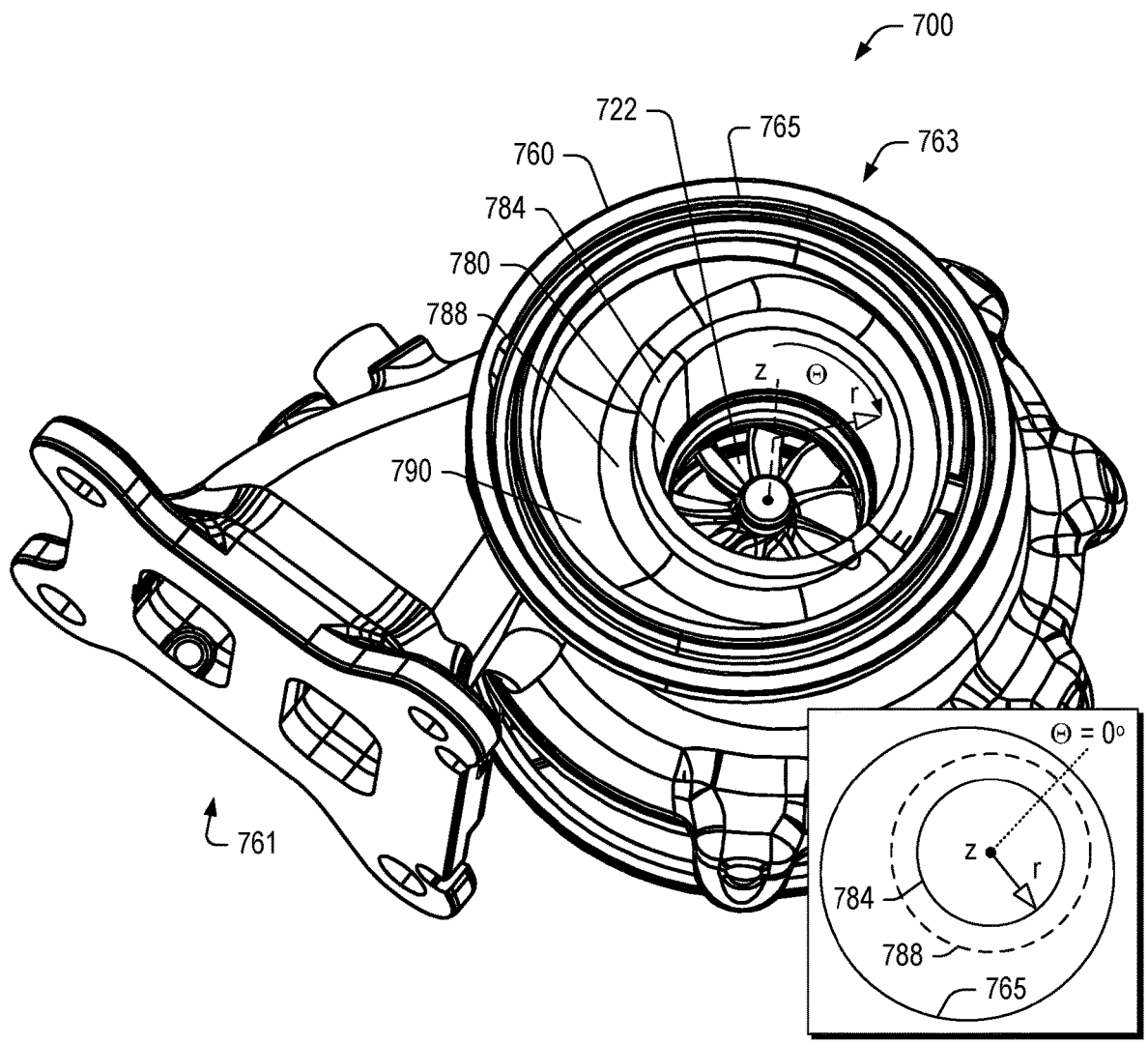
FIG. 8 is a perspective view of a portion of an example of a turbocharger.

FIG. 8 shows a perspective view of an example of a portion of a turbocharger 700 with the turbine housing 760 that includes one or more inlet passages 761 and the wall 780, which can define at least part of an outlet passage 763. As shown, the axis of the turbine wheel 722 is offset (e.g., shifted) from an axis of the opening 765. In such an example, the axes may be parallel or, for example, the axis of the opening 765 may be tilted slightly with respect to the axis of the turbine wheel 722 (e.g., less than approximately 45 degrees). In the example of FIG. 8, the one or more inlet passages 761 extend outwardly where the axis of the opening 765 is offset from the axis of the turbine wheel 722 in a general direction of the one or more inlet passages 761. In such an example, the size of the opening 765 may be sufficiently large to couple to a treatment unit without enlarging an overall footprint of the turbine housing 760; noting that in various other examples, a turbine housing may be shaped differently, configured differently, etc., with respect to one or more inlet passages (see, e.g., the turbine housing 460 of FIG. 4A, which may be integral with the manifold 176).

FIG. 8 also shows an example of a cylindrical coordinate system with a z coordinate along a z-axis, an r coordinate in r-direction and an azimuthal angle $\Theta$. In the example of FIG. 8, the wall 780 and one or more other features of the turbine housing 760 and/or the turbocharger 700 can be defined using dimensions in the cylindrical coordinate system. As an example, a surface of the wall 780 may be a revolved surface in an azimuthal direction, denoted by the angle $\Theta$, where revolution may be about the z-axis. As an example, the wall 780 may extend equally to a rim (e.g., the peak 784) about 360 degrees or, for example, the wall 780 may extend to a rim that is of different heights, for example, from a base, which may be even or uneven. As an example, a rim (e.g., the peak 784) may be in a plane that is perpendicular to the z-axis or that is tilted at an angle with respect to the z-axis.

In the example of FIG. 8, the angle $\Theta$ may be zero degrees in a direction that may be a direction of the one or more inlet passages 761 and/or a volute inlet. In such an example, the peak 784 (e.g., rim) may be closest to the wall 790 at or approximately at angle $\Theta$ equal to zero (e.g., plus or minus 15 degrees). As an example, the wall 780 may transition to the wall 790 without a valley where it is closest to the wall 790 (e.g., the valley 788 may be less than 360 degrees about the wall 780).

Figure 9:
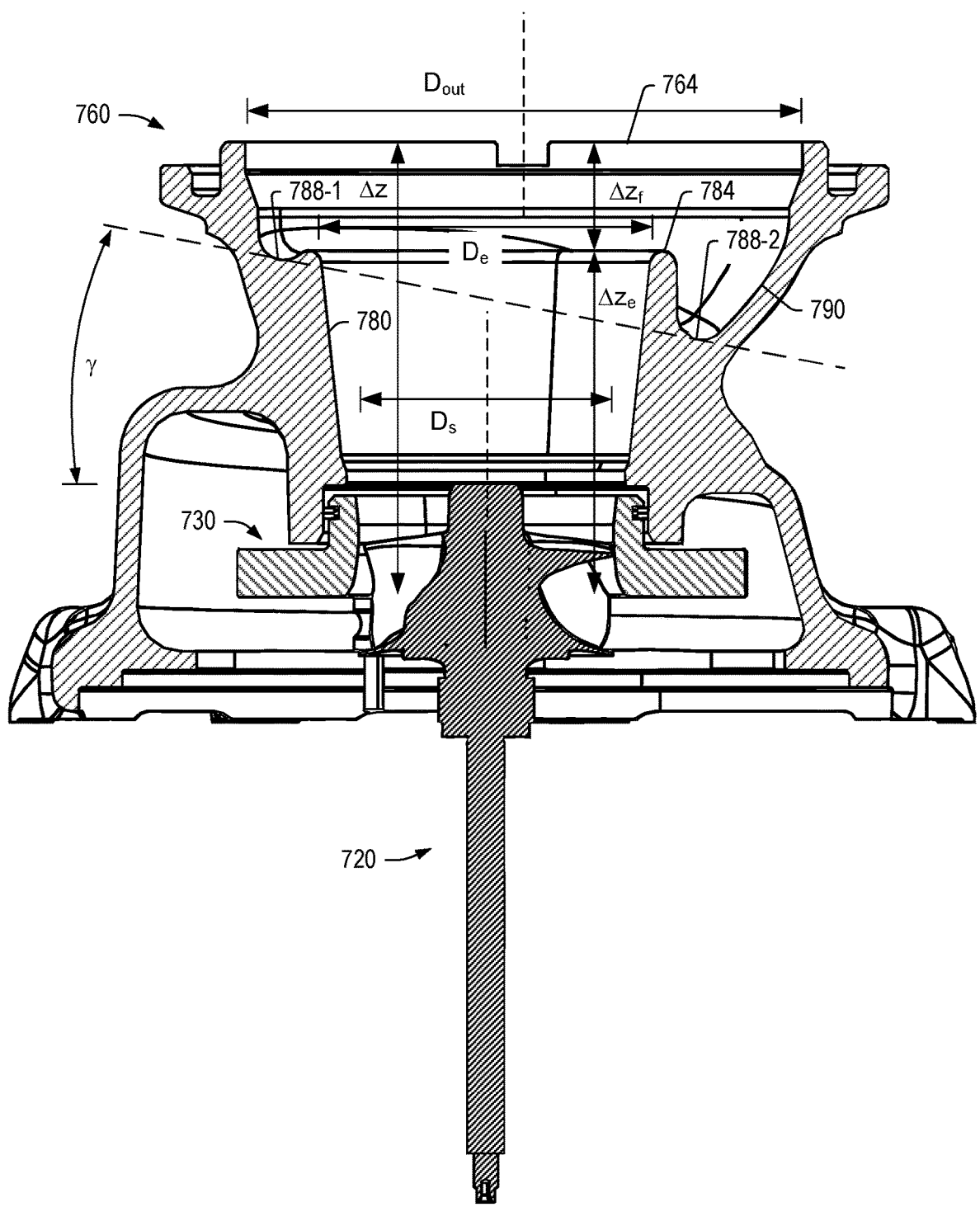
FIG. 9 is a cross-sectional view of a portion of the turbocharger of FIG. 8.

FIG. 9 shows a cross-sectional view of a portion of the turbocharger 700, as including a shaft and wheel assembly 720 that includes the turbine wheel 722, as including an insert 730 of a variable nozzle cartridge (e.g., a VNT, etc.) and as including the turbine housing 760. FIG. 9 also shows a dimension $\Delta z_p$ as an axial distance from the peak 784 to the end 764 of the turbine housing 760. In FIG. 9, an angle $\gamma$ is shown that can at least in part define the valley 788, for example, with respect to a plane where the rotational axis (e.g., axis of the turbine wheel space) is perpendicular (normal) to the plane. In the example of FIG. 9, the angle $\gamma$ is approximately 10 degrees as defined by a line passing through the two labeled valley points 788-1 and 788-2. In the example of FIG. 9, the angle $\gamma$ may be a maximum angle where the valley point 788-1 is the highest and where the value point 788-2 is the lowest. As an example, for a portion of a turbine housing, a valley point may be approximately even with a peak point. As an example, a valley may be a contiguous annular valley or, for example, may be a portion of an annulus (e.g., less than 360 degrees about a peak). Where the wall 780 is surrounded by a valley 788 that is less than a full annulus (e.g., less than 360 degrees), the wall 780 may include a region that transitions to the wall 790 without descending to the valley 788. For example, in FIG. 8, the valley 788 of the turbine housing 780 may be less than 360 degrees about the wall 780 such that, for a portion of 360 degrees, the wall transitions to the wall 790 without descending to the valley 788.

As shown in the example of FIG. 9, the wall 780 can include an inner axial height and an outer axial height where the outer axial height can be defined in part via the valley 788 where the outer axial height may vary azimuthally about an axis of the turbine wheel space. As an example, the wall 780 may define a volume with respect to the wall 790 where the volume may be asymmetric. For example, the volume can be greater where the valley 788 is deeper.

As explained, function of a catalyst of a treatment unit can depend on heat distribution to the inlet of the treatment unit. A flow uniformity index can be utilized to define how uniform flow is at an inlet or, for example, computational fluid dynamics (CFD) may be utilized where flow and flow patterns may be analyzed (e.g., contours, streamlines, etc.). As explained, an increase in flow uniformity can increase catalyst reaction efficiency. As the position of a turbocharger turbine wheel axis may be shifted with respect to a catalyst treatment unit axis, without a wall such as the wall 780, heat can be less uniformly distributed at a catalyst inlet area and, for example, may be other than in a perpendicular direction to the catalyst inlet area. Lack of uniformity can impact catalyst reaction efficiency and stability of gas conversion (e.g., emissions).

As shown in the example of FIG. 9, the wall 780 can be a housing duct portion that directs exhaust gas flow to a desired area of an outlet where, for example, distances may be relatively short (e.g., as measured by a turbine wheel axial length, a turbine wheel leading edge blade axial height, etc.). Such a housing duct portion (e.g., an internal duct or passage portion) can direct exhaust gas where the exhaust gas flow can be more uniform at a catalyst inlet area of a treatment unit. The wall 780 can help to aim exhaust gas into a catalytic region, which can also help to ensure stable function. The wall 780 may be referred to as an internal housing stack pipe, which can be at least in part interior to an outer wall (e.g., the wall 790) such that a turbine housing may be referred to as "double walled" at least over an azimuthally defined portion. Such an internal housing stack pipe can help to achieve a desired catalyst inflow uniformity index value (e.g., flow profile, etc.) and, for example, a desired pressure gradient (e.g., pressure profile, etc.), for proper treatment unit catalyst functionality.

As an example, the wall 780 can be shaped such that more uniform flow is achieved, for example, in a manner that does not risk over heating of catalyst in a region of a treatment unit when a turbocharger may be operating at peak power. For example, uniform flow can reduce risk of hot spot formation. Where flow is not uniform, it may be of a considerably greater velocity along a centerline where impingement of such higher velocity flow can cause a hot spot in a catalyst region of a treatment unit.

In the example of FIG. 9, the "double-wall" approach can provide for some amount of heat conservation as the wall 780 is at least in part bounded by the wall 790 where the wall 790 is an exterior wall (e.g., consider heat exchange with a cooler ambient environment about the exterior wall). In FIG. 9, the wall 780 acts as a duct or pipe that can help to separate flow from the wall 790 in a particular axial location, which can promote flow uniformity in front of a catalyst region of a treatment unit.

In the example of FIG. 9, the wall 790 may be appropriately sized and/or shaped to accommodate one or more standardization of attachment diameters of one or more treatment units. In the example, of FIG. 9, the wall 780 performs a flow uniformity function while the wall 790 performs a turbine housing shape function for operatively coupling a turbine housing to a treatment unit. In the example of FIG. 9, the "double-wall" approach can tailor each wall separately to perform its particular function or functions while, for example, providing for some amount of heat retention (e.g., reduced heat loss) where a space (e.g., a volume) exists between at least a portion of the wall 780 and the wall 790. As explained, the wall 780 can be at least in part an interior wall and the wall 790 can be an exterior wall where flow and heat can be appropriately directed to a catalyst inlet region of a treatment unit.

In various examples, an internal duct may be cast as part of a turbine housing and/or be provided as a separate part that can be fit to a turbine housing. As an example, a turbine housing can include attachment features such as threads or bayonets where a wall can include corresponding attachment features. In such an example, depending on the application, the treatment unit, space, etc., an appropriate wall may be selected and then coupled to a turbine housing to provide for flow uniformity to the treatment unit.

Figure 10:
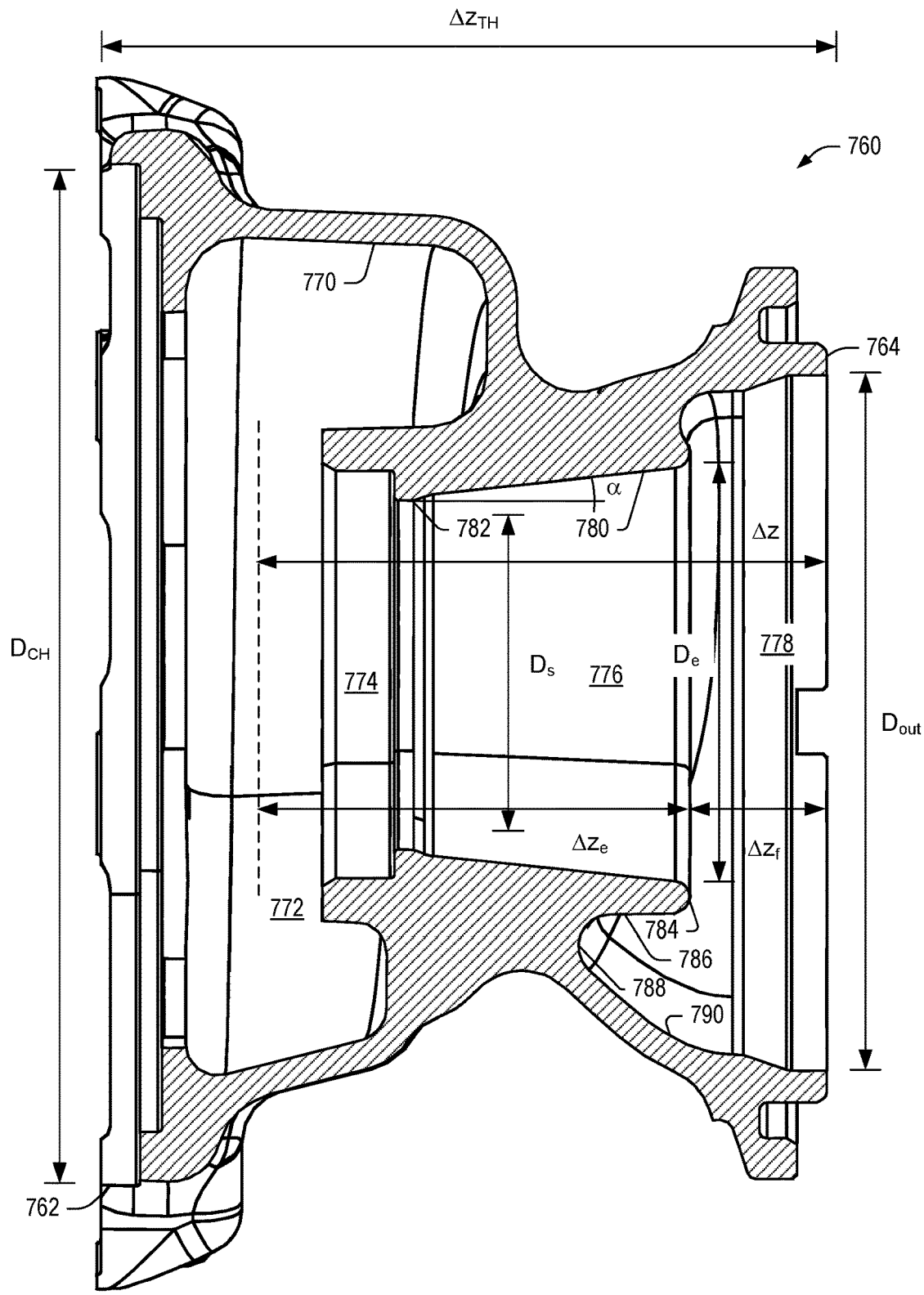
FIG. 10 is a cross-sectional view of an example of a turbine housing of the turbocharger of FIG. 8.

FIG. 10 shows a cross-sectional view of the turbine housing 760 along with an angle dimension, a, which is an angle of the wall 780, an overall length dimension $\Delta z_{TH}$ and a center housing coupling dimension $D_{CH}$.

Figure 11:
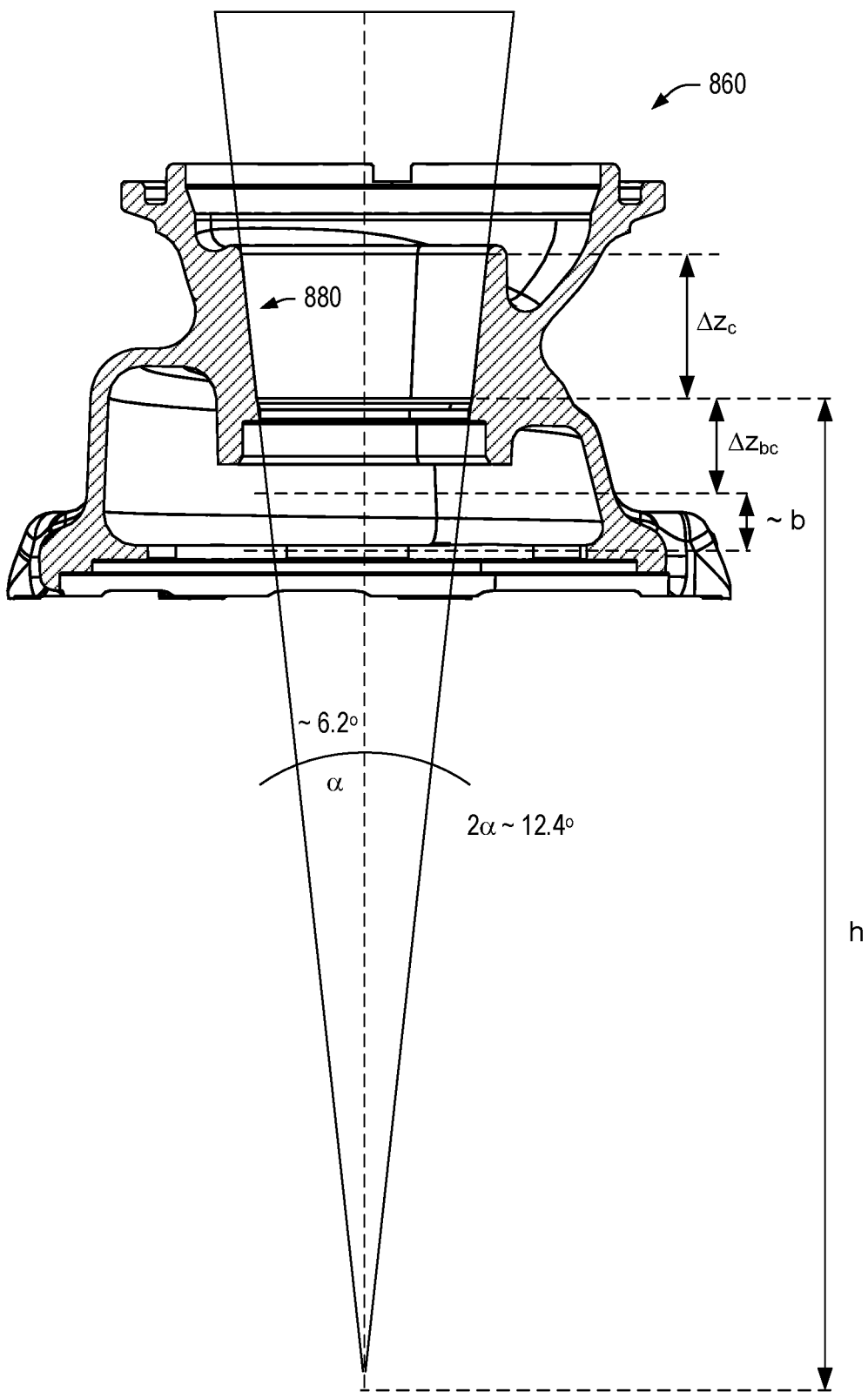
FIG. 11 is a cross-sectional view of an example of a turbine housing.

FIG. 11 shows a cross-sectional view of an example of a turbine housing 860 where the angle $\alpha$ is shown to be approximately 6.2 degrees and where an open angle of a cone may be twice $\alpha$, for example, approximately 12.4 degrees. FIG. 11 also shows a dimension b, as a turbine wheel leading edge blade height, a dimension $\Delta z_{bc}$ from the leading edge blade top to a wall 880 that can be defined by the angle $\alpha$ and a dimension $\Delta z_c$, that may be a cone dimension that can characterize the wall 880, noting that a dimension h may be a cone dimension that is measured from a vertex or origin of a cone.

As an example, the wall 880 may be characterized by the angle $\alpha$ within a range from approximately 0 degrees to approximately 15 degrees or, for example, within a range from greater than 5 degrees to approximately 15 degrees. As to a cone open angle (e.g., $2\alpha$), consider greater than 10 degrees to approximately 30 degrees.

A right cone or a portion thereof may be defined using a dimension along an axis such as a z-axis in a cylindrical coordinate system where the right cone or portion thereof increases in its radial dimension as may be measured by an r-axis. A surface may be a revolved surface in an azimuthal direction, denoted by an angle $\Theta$. As an example, a cone may extend equally to a rim about 360 degrees or, for example, a cone may extend to a rim that is of different heights from a base, which may be even or uneven.

As an example, a right cone may be defined in part by open angle. For example, consider a right cone of a height h and a radius r where an open angle (or opening angle) $\vartheta$ (e.g., consider $2\alpha$) can be defined via an equation as follows:

$$\vartheta = 2\tan^{-1}\left(\frac{r}{h}\right)$$

As an example, a region may be defined via a volume, one or more areas, one or more slant heights, etc. For example, consider a volume of cone (e.g., $$V = \frac{1}{3}A_b h,$$

where $A_b$ is a base area or top area).

Figure 12:
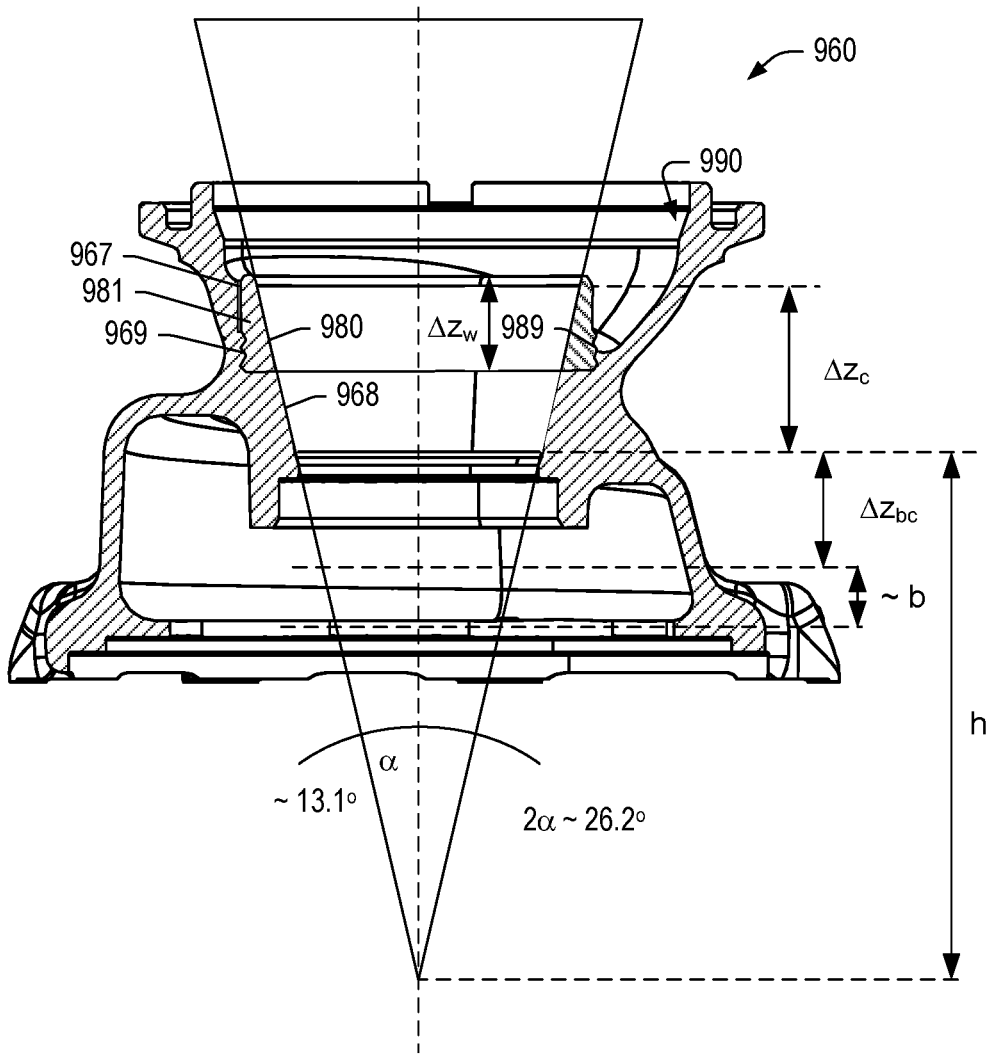
FIG. 12 is a cross-sectional view of an example of a turbine housing.

FIG. 12 shows a cross-sectional view of an example of a turbine housing 960 where the wall 980 may be formed integrally with the turbine housing 960 and/or via a separate wall component 981 that can be fit to the turbine housing 960. For example, consider the turbine housing 960 as including features 969 such as threads, etc., and the wall component 981 with features such as mating threads 989, etc. As shown, the wall component 981 can include an axial height $\Delta z_w$, which may be selectable via selecting a particular compatible wall component (e.g., with a desired size, shape, etc.). As an example, the wall component 981 may be threaded into a socket of the turbine housing 960 such that threads mate for securing the wall component 981 to the turbine housing 960. Where the wall component 981 is utilized, the wall 980 may be defined in part via a wall 968 of the turbine housing 960 and in part via the wall component 981. In such an example, the dimension $\Delta z_c$ may be a sum of two axial heights. While threads are mentioned in the example of FIG. 12, one or more other techniques, technologies, etc., may be utilized (e.g., bayonet, interference fit, welding, etc.).

As an example, where the separate wall component 981 is utilized, one or more gaps 967 (e.g., radial gap(s)) may exist, which may help to reduce heat transfer from the wall component 981 to the turbine housing 960. Where heat transfer is reduced, more exhaust gas heat may be retained for utilization by a catalyst region of a treatment unit.

In the example of FIG. 12, the angle $\alpha$ is shown to be approximately 13.1 degrees, where an open angle of a cone may be twice $\alpha$, for example, approximately 26.2 degrees. FIG. 12 also shows a dimension b, as a turbine wheel leading edge blade axial height, a dimension $\Delta z_{bc}$ from the leading edge blade top to a wall 980 that can be defined by the angle $\alpha$ and a dimension $\Delta z_c$ that may be a cone dimension that can characterize the wall 980, noting that a dimension h may be a cone dimension that is measured from a vertex or origin of a cone.

As an example, the wall 980 may be characterized by the angle $\alpha$ within a range from approximately 0 degrees to approximately 15 degrees or, for example, within a range from greater than 5 degrees to approximately 15 degrees. As to a cone open angle or opening angle (e.g., $2\alpha$), consider greater than 10 degrees to approximately 30 degrees.

As shown in various examples (see, e.g., FIGS. 7, 8, 9, 10, 11 and 12), the turbine housing 760 (or turbine housings 860 or 960) can include a bearing housing end 762 and a treatment unit end 764; a volute wall 770 that defines a volute; a wall 780 (e.g., a wall 880 or a wall 980) that defines at least a portion of a turbine wheel space that defines a turbine wheel space axis and a turbine wheel space diameter $D_s$, where the wall 780 extends to an axial peak to define an extended space with an extended space outlet having an extended space outlet dimension $D_e$; and an outlet wall 790 that defines an outlet space with a treatment unit end outlet having an outlet dimension $D_{out}$, where the extended space is disposed axially between the turbine wheel space and the outlet space to increase axial velocity uniformity at the treatment unit end outlet.

As an example, the wall 780, the wall 880 or the wall 980 may be symmetric about an axis and represented by revolution, for example, according to an angle $\alpha$ or, for example, a cone open angle $2\alpha$, or, for example, the wall 780, the wall 880 or the wall 980 may be characterized by an angle $\alpha$ while differing in part from a surface of revolution about an axis. For example, consider utilizing the angle $\alpha$ to characterize a mean diameter of the wall 780, the wall 880 or the wall 980 between a smaller upstream diameter and a larger downstream diameter.

As an example, a turbine housing can include a bearing housing end (see, e.g., the end 762) and a treatment unit end (see, e.g., the end 764); a volute wall (see, e.g., the volute wall 770) that defines a volute; a wall (see, e.g., the walls 780, 880 and 980) that defines at least a portion of a turbine wheel space that defines a turbine wheel space axis and a turbine wheel space diameter ($D_s$), where the wall extends to an axial peak to define an extended space with an extended space outlet having an extended space outlet dimension ($D_e$); and an outlet wall (see, e.g., the outlet wall 790) that defines an outlet space with a treatment unit end outlet having an outlet dimension ($D_{out}$), where the extended space is disposed at least in part axially between the turbine wheel space and the outlet space to increase axial velocity uniformity at the treatment unit end outlet. In such an example, a portion of the wall that defines the extended space can be disposed at an angle with respect to the turbine wheel space axis, where the angle is greater than 0 degrees and less than 15 degrees, for example, consider the angle being greater than 5 degrees and less than 15 degrees. As an example, such an angle may be in a range greater than 6 degrees and less than 15 degrees.

As an example, a turbine housing can include a turbine wheel space diameter ($D_s$), an extended space outlet dimension ($D_e$); and a treatment unit end outlet having an outlet dimension ($D_{out}$) where $D_s < D_e < D_{out}$. As an example, an axial distance from an axial peak of a wall to a treatment unit end outlet may be less than $D_s$. As an example, $D_e$ may be greater than 110 percent of $D_s$ and less than 200 percent of $D_s$.

As an example, a turbine housing can include a wall (see, e.g., the walls 780, 880 and 980) that descends from an axial peak to an axial valley. In such an example, the turbine housing can include a transition from the wall to another wall (see, e.g., the wall 790) where the transition is at the axial valley. As an example, an axial valley may vary in depth with respect to an axial peak or an axial rim. For example, in FIG. 8, the axial valley 788 can vary with respect to the angle $\Theta$ such that it is deeper on one side compared to another, opposing side. For example, depth of an axial valley can vary azimuthally about a turbine wheel space axis. As shown in the example of FIG. 8, the axial valley 788 is deeper on a side that corresponds to an inlet side of a volute defined at least in part by the turbine housing 760 (see, e.g., the one or more inlet passages 761 of FIG. 8). As an example, an axial valley may define a plane that may be tilted with respect to a turbine wheel space axis (e.g., in a tilt direction as shown in FIG. 8, 9, 10, 11 or 12).

As an example, a turbine housing can include a treatment unit end outlet that defines an outlet axis that is offset from a turbine wheel space axis. In such an example, an axial peak may be an annular axial peak centered on the turbine wheel space axis.

As an example, a turbine housing can be part of an assembly that includes an insert that defines in part a turbine wheel space. For example, consider an insert that is a variable nozzle cartridge insert (e.g., part of a variable nozzle cartridge, etc.).

As an example, a turbine housing can include a multiple cylinder exhaust manifold. For example, consider a multiple cylinder exhaust manifold that is cast integrally with a turbine housing.

As an example, a turbocharger can include a bearing housing assembly; and a turbine housing assembly, where the turbine housing assembly includes bearing housing end and a treatment unit end, a volute wall (e.g., or volute walls) that defines a volute (e.g., or volutes), a wall that defines at least a portion of a turbine wheel space that defines a turbine wheel space axis and a turbine wheel space diameter ($D_s$), where the wall extends to an axial peak to define an extended space with an extended space outlet having an extended space outlet dimension ($D_e$), and an outlet wall that defines an outlet space with a treatment unit end outlet having an outlet dimension ($D_{out}$), where the extended space is disposed at least in part axially between the turbine wheel space and the outlet space to increase axial velocity uniformity at the treatment unit end outlet. In such an example, the turbocharger can include a treatment unit. For example, consider a treatment unit coupled to a turbine housing to receive exhaust via a treatment unit end outlet of the turbine housing. As an example, a treatment unit can include at least one catalyst. As an example, a turbine housing of a turbocharger may be cast integrally with a multiple cylinder exhaust manifold.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine housing comprising:
   a bearing housing end (762) and a treatment unit end (764);
   a volute wall (770) that defines a volute;
   a wall (780, 880, 980) that defines at least a portion of a turbine wheel space that defines a turbine wheel space axis and a turbine wheel space diameter ($D_s$), wherein the wall (780) extends a first axial distance ($\Delta z_e$) from a lowermost axial point to an axial peak to define an extended space with an extended space outlet having an extended space outlet dimension ($D_e$); and
   an outlet wall (790) that defines an outlet space with a treatment unit end outlet having an outlet dimension ($D_{out}$), wherein the outlet wall extends from an axial valley to the treatment unit end, each cross-sectional area of the outlet wall remains constant or increases at each axial position along an outward direction of the turbine wheel space axis from an outwardmost axial position of the axial valley to the treatment unit end, and wherein the extended space is disposed at least in part axially between the turbine wheel space and the outlet space to increase axial velocity uniformity at the treatment unit end outlet, and wherein a second axial distance ($\Delta z_f$) from the axial peak to an axial position of the treatment unit end is less than the first axial distance ($\Delta z_e$) and wherein the outlet dimension ($D_{out}$) is greater than a sum of the first axial distance ($\Delta z_e$) and the second axial distance ($\Delta z_f$).

2. The turbine housing of claim 1, wherein a portion of the wall (780, 880, 980) that defines the extended space is disposed at an angle with respect to the turbine wheel space axis, wherein the angle is greater than 0 degrees and less than 15 degrees.

3. The turbine housing of claim 1, wherein a portion of the wall (780, 880, 980) that defines the extended space is disposed at an angle with respect to the turbine wheel space axis, wherein the angle is greater than 5 degrees and less than 15 degrees.

4. The turbine housing of claim 1, wherein $D_s < D_e < D_{out}$.

5. The turbine housing of claim 1, wherein the second axial distance ($\Delta z_f$) from the axial peak to the treatment unit end outlet is less than $D_s$.

6. The turbine housing of claim 1, wherein $D_e$ is greater than 110 percent of $D_s$ and less than 200 percent of $D_s$.

7. The turbine housing of claim 1, wherein the wall (780, 880, 980) descends from the axial peak to the axial valley.

8. The turbine housing of claim 7, wherein the wall (780, 880, 980) transitions to the outlet wall (790) at the axial valley.

9. The turbine housing of claim 7, wherein depth of the axial valley varies azimuthally about the turbine wheel space axis.

10. The turbine housing of claim 1, wherein the treatment unit end outlet defines an outlet axis that is offset from the turbine wheel space axis.

11. The turbine housing of claim 10, wherein the axial peak is an annular axial peak centered on the turbine wheel space axis.

12. The turbine housing of claim 1, comprising an insert that defines in part the turbine wheel space.

13. The turbine housing of claim 12, wherein the insert is a variable nozzle cartridge insert.

14. The turbine housing of claim 1, comprising a multiple cylinder exhaust manifold.

15. The turbine housing of claim 14, wherein the multiple cylinder exhaust manifold is cast integrally with the turbine housing.

16. A turbocharger comprising:
    a bearing housing assembly; and
    a turbine housing assembly, wherein the turbine housing assembly comprises
    a bearing housing end (762) and a treatment unit end (764),
    a volute wall (770) that defines a volute,
    a wall (780, 880, 980) that defines at least a portion of a turbine wheel space that defines a turbine wheel space axis and a turbine wheel space diameter ($D_s$), wherein the wall (780) extends to an axial peak to define an extended space with an extended space outlet having an extended space outlet dimension ($D_e$), and
    an outlet wall (790) that defines an outlet space with a treatment unit end outlet having an outlet dimension ($D_{out}$), wherein the outlet wall extends from an axial valley to the treatment unit end, each cross-sectional area of the outlet wall remains constant or increases at each axial position along an outward direction of the turbine wheel space axis from an outwardmost axial position of the axial valley to the treatment unit end, and wherein the extended space is disposed at least in part axially between the turbine wheel space and the outlet space to increase axial velocity uniformity at the treatment unit end outlet, wherein the bearing housing end, the treatment unit end, the volute wall, the wall and the outlet wall are integrally cast portions of a single piece turbine housing.

17. The turbocharger of claim 16, comprising a treatment unit.

18. The turbocharger of claim 17, wherein the treatment unit is coupled to the turbine housing to receive exhaust via the treatment unit end outlet of the turbine housing.

19. The turbocharger of claim 16, wherein the treatment unit comprises at least one catalyst.

20. The turbocharger of claim 16, wherein the turbine housing is cast integrally with a multiple cylinder exhaust manifold.

\* \* \* \* \*